United States Patent
Kataoka

(10) Patent No.: US 8,294,824 B2
(45) Date of Patent: Oct. 23, 2012

(54) METHOD AND SYSTEM FOR VIDEO COMPOSITING USING COLOR INFORMATION IN COMPARISON PROCESSING

(75) Inventor: Kouji Kataoka, Tokyo (JP)

(73) Assignee: M. Soft Co., Ltd., Tokyo (JP)

( * ) Notice: Subject to any disclaimer, the term of this patent is extended or adjusted under 35 U.S.C. 154(b) by 492 days.

(21) Appl. No.: 12/306,003

(22) PCT Filed: Mar. 28, 2008

(86) PCT No.: PCT/JP2008/000783
§ 371 (c)(1),
(2), (4) Date: Oct. 28, 2009

(87) PCT Pub. No.: WO2008/126371
PCT Pub. Date: Oct. 23, 2008

(65) Prior Publication Data
US 2010/0066910 A1 Mar. 18, 2010

(30) Foreign Application Priority Data
Apr. 2, 2007 (JP) .................................. 2007-120125

(51) Int. Cl.
*H04N 9/74* (2006.01)
*H04N 9/76* (2006.01)
(52) U.S. Cl. ......................... 348/586; 348/590; 348/598
(58) Field of Classification Search .......... 348/584–586, 348/590, 591, 598, 600, 239; 382/195, 283; 345/629, 632, 634, 635, 611
See application file for complete search history.

(56) References Cited

U.S. PATENT DOCUMENTS

| | | | | |
|---|---|---|---|---|
| 4,417,791 A * | 11/1983 | Erland et al. | ..................... | 352/45 |
| 5,196,922 A * | 3/1993 | Yeomans | ....................... | 348/578 |
| 5,400,081 A * | 3/1995 | Chaplin | ........................ | 348/587 |
| 5,781,198 A * | 7/1998 | Korn | ............................... | 345/634 |
| 5,940,139 A * | 8/1999 | Smoot | .......................... | 348/584 |
| 5,953,076 A * | 9/1999 | Astle et al. | .................... | 348/584 |
| 6,753,929 B1 * | 6/2004 | Sheraizin et al. | ............ | 348/586 |
| 6,819,796 B2 * | 11/2004 | Hong et al. | ................... | 382/173 |
| 6,912,313 B2 * | 6/2005 | Li | ................................. | 382/219 |
| 7,024,054 B2 * | 4/2006 | Cahill et al. | .................. | 382/294 |
| 7,254,268 B2 * | 8/2007 | Zhao et al. | .................... | 382/190 |
| 7,574,070 B2 * | 8/2009 | Tanimura et al. | ............. | 382/284 |
| 7,742,108 B2 * | 6/2010 | Sheraizin et al. | ............ | 348/586 |
| 7,956,929 B2 * | 6/2011 | Relan et al. | .................... | 348/576 |
| 2002/0037103 A1 * | 3/2002 | Hong et al. | ................... | 382/173 |
| 2003/0174253 A1 * | 9/2003 | Ito et al. | ........................ | 348/699 |

FOREIGN PATENT DOCUMENTS

| | | |
|---|---|---|
| JP | 10240908 A | 9/1988 |
| JP | 7162737 A | 6/1995 |
| JP | 1127577 A | 1/1999 |
| JP | 2000261774 A | 9/2000 |

* cited by examiner

*Primary Examiner* — Victor Kostack
(74) *Attorney, Agent, or Firm* — Porzio, Bromberg & Newman, P.C.

(57) ABSTRACT

Using a background-side image which is a shot of an arbitrary background and a material-side image which is a shot of a composition material against the same background, two images are compared to extract an image material to be composited. Images shot in any scenery can thus be used to extract a composition material, being part of the images, without using a certain background such as a blue screen.

9 Claims, 8 Drawing Sheets

Fig. 8

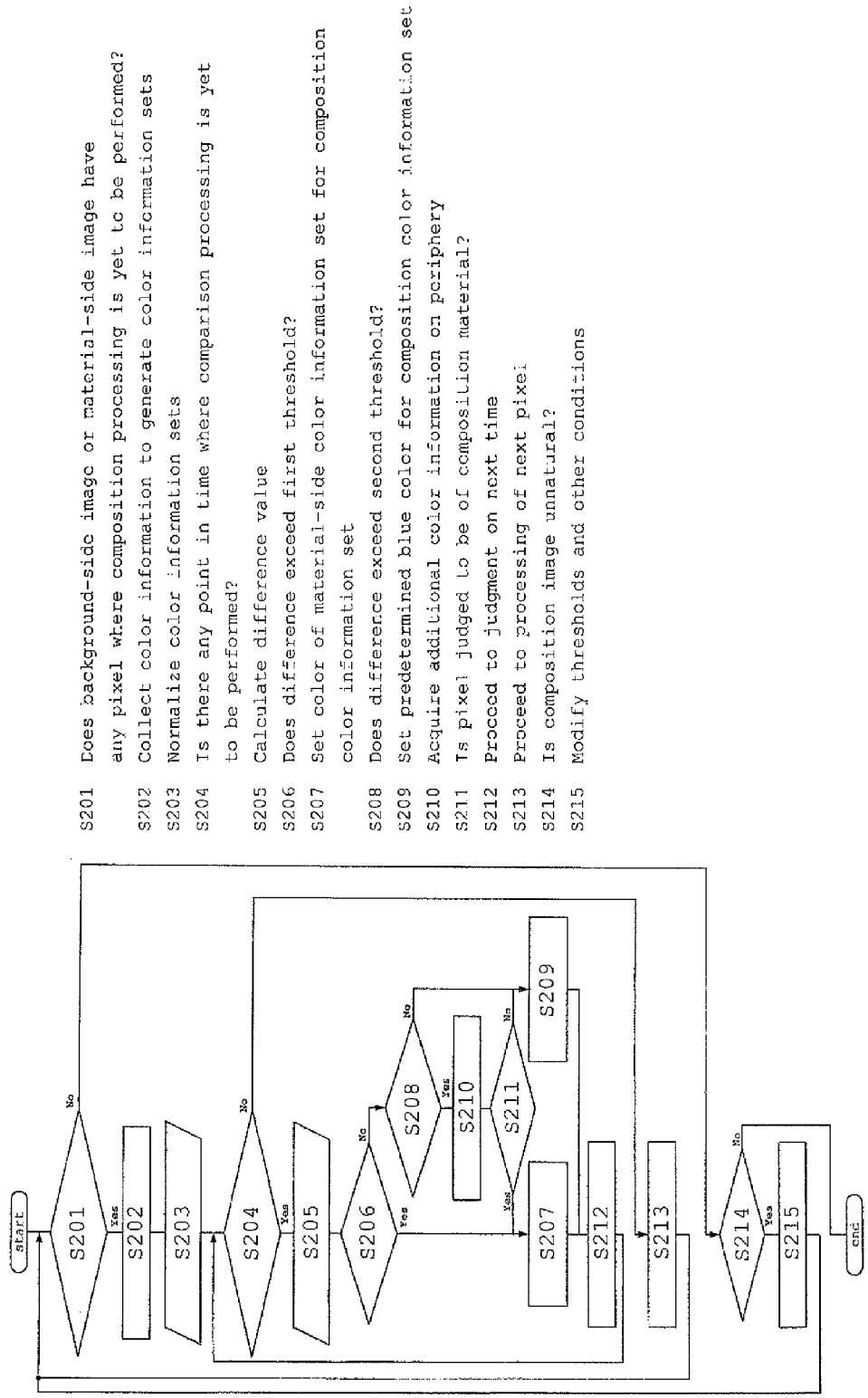

S201  Does background-side image or material-side image have any pixel where composition processing is yet to be performed?
S202  Collect color information to generate color information sets
S203  Normalize color information sets
S204  Is there any point in time where comparison processing is yet to be performed?
S205  Calculate difference value
S206  Does difference exceed first threshold?
S207  Set color of material-side color information set for composition color information set
S208  Does difference exceed second threshold?
S209  Set predetermined blue color for composition color information set
S210  Acquire additional color information on periphery
S211  Is pixel judged to be of composition material?
S212  Proceed to judgment on next time
S213  Proceed to processing of next pixel
S214  Is composition image unnatural?
S215  Modify thresholds and other conditions

METHOD AND SYSTEM FOR VIDEO COMPOSITING USING COLOR INFORMATION IN COMPARISON PROCESSING

CROSS REFERENCE TO RELATED APPLICATION

This is a National Stage of International Application /JP2008/000783, filed 28 Mar. 2008, which claims the benefit of Application No. 2007-120125, filed in Japan on 2 Apr. 2007, the disclosures of which Applications are incorporated by reference herein.

TECHNICAL FIELD

The present invention relates to a technology for cutting out a composition material alone from an image that is shot without the use of any special background such as a blue screen, thereby generating an image to be composited.

BACKGROUND ART

When making films and other video works, compositing technologies are indispensable. Images to be composited are often shot using bluescreen techniques.

Bluescreen compositing refers to a technology for shooting an image intended for composition against a background of blue cloth or the like (hereinafter, referred to as a blue screen). Special image processing for handling the portions of the blue screen as being transparent is applied to the shot image in order to generate a composition image, which is then composited with another background image. For example, if a figure and a background are to be composited, the figure, being a composition material, is shot in front of the blue screen. A background image prepared separately is then composited into the portions of the blue screen in the shot image.
[Patent document 1] Japanese Patent Application No. Hei 8-300219
[Patent Document 2] Japanese Patent Application Laid-Open No. 2007-142726

DISCLOSURE OF THE INVENTION

Problems to be Solved by the Invention

This bluescreen compositing uses a composition image which is shot against a blue screen. The bluescreen compositing therefore requires the provision of a blue screen, being a temporary background. Nevertheless, there has been a problem in that blue screens are only available in some film studios, and both film studios and blue screens incur significant costs and consume a lot of time to use, prepare, and the like.

Because of the limited number of film studios, there has been another problem in that it is difficult to arrange to use a film studio in the event a retake of alternative shots and the like must be conducted at short notice. Yet another problem has been that possible image sizes are limited to the sizes of the film studios and blue screens available.

Moreover, when compositing an image that is shot in a film studio under artificial lighting and a background image that is shot under sunlight, the composition processing has sometimes resulted in an unnatural image due to slight differences in the lighting obtained for each image.

In order to generate a composition image without using a blue screen, a composition material may be manually cut from an ordinarily-shot image using image processing software which runs on a digital computer. Nevertheless, this manual cutting requires significant time and labor costs. There has also been the problem of failing to extract details precisely, resulting in an unnatural composition image without fine nuances.

Some software can detect the contours and the like of a composition material and cut the composition material automatically from an image that includes the composition material. The process of detecting and cutting out the dynamically-changing contours, however, has had the problem of being complicated, thereby requiring enormous amounts of information processing.

The present invention has been developed in view of the foregoing problems. It is thus an object of the present invention to provide a video compositing system and a video compositing method for generating a composition image to be composited, in which a composition image having an extracted composition material alone is obtained from an image that is shot against an arbitrary background, without using an image that is shot against a blue screen.

Means for Solving the Problems

Bluescreen compositing refers to the technology of shooting an image material intended for video compositing or the like against a blue screen, handling the portions of the blue screen as being transparent in the image obtained, and compositing another image into the transparent portions. The blue screen is used to make a distinction between the portions where the image material is made transparent (blue-screen portions) and where it is not (portions other than the blue screen). That is, the same compositing as achieved using a conventional blue screen can be achieved without using a blue screen if the portions to be made transparent and those not made transparent can be distinguished from each other.

Then, the foregoing object can be achieved by the following means.

To achieve the foregoing object, the present invention provides a video compositing method which comprises extracting an image material intended for composition from an image which is shot against an arbitrary background without provision of a certain background such as a blue screen.

To achieve the foregoing object, the present invention provides a video compositing method which comprises: preparing a background-side image which is a shot of an arbitrary background and a material-side image which is a shot of a composition material against the same background as that of the background-side image; and performing comparison processing on the background-side image and the material-side image to generate a composition image in which the composition material is extracted.

To achieve the foregoing object, the video compositing method according to the foregoing invention is characterized in that the comparison processing includes comparing color values between the background-side image and the material-side image in respective areas of comparison lying in the same positions in respective frames of the same timing, the areas of comparison including one or more pixels.

To achieve the foregoing object, the video compositing method according to the foregoing invention is characterized in that when the areas of comparison of the background-side image and the material-side image have a difference in color value, the color value in the area of comparison of the material-side image is set for the color value in the area of comparison of the composition image.

To achieve the foregoing object, the video compositing method according to the foregoing invention is characterized in that the composition image is generated by performing the comparison processing on all frames and all pixels of the background-side image and the material-side image.

To achieve the foregoing object, the video compositing method according to the foregoing invention is characterized in that the comparison processing includes: collecting color information on a certain area of comparison from a group of frames for a predetermined duration of the background-side image along a time axis, thereby generating a background-side color information set; collecting color information on the certain area of comparison from a group of frames for the predetermined duration of the material-side image along the time axis, thereby generating a material-side color information set; and comparing the background-side color information set and the material-side color information set along the time axis, thereby generating composition color information on the certain area of comparison of the composition image.

To achieve the foregoing object, the video compositing method according to the foregoing invention is characterized in that: the background-side color information set is normalized along the time axis; and the normalized background-side color information set is compared with the material-side color information set.

To achieve the foregoing object, the video compositing method according to the foregoing invention is characterized in that when a point in time is detected where the background-side color information set and the material-side color information set have a difference smaller than a predetermined threshold, color information on periphery of the color information at the point in time is acquired from the frame of the material-side image at the point in time, and the color information on the periphery is consulted to judge whether or not to set the color of the material-side color information set for the composition color information.

To achieve the foregoing object, the video compositing method according to the foregoing invention is characterized in that both the background-side image and the material-side image are shot by a motion control camera.

To achieve the foregoing object, the present invention provides a video compositing system which comprises: background-side image storing means for storing a background-side image which is a shot of an arbitrary background; material-side image storing means for storing a material-side image which is a shot of a composition material against the same background as that of the background-side image; comparison processing means for comparing the background-side image and the material-side image, and generating a composition image in which the composition material is extracted based on the result of comparison; and composition image storing means for storing the composition image.

To achieve the foregoing object, the video compositing method according to the foregoing invention is characterized in that the comparison processing means compares color values between the background-side image and the material-side image in respective areas of comparison lying in the same positions in respective frames of the same timing, the areas of comparison including one or more pixels.

To achieve the foregoing object, the video compositing method according to the foregoing invention is characterized in that the comparison processing means comprises: a difference calculation unit for calculating a difference in color value between the background-side image and the material-side image in the areas of comparison; and a color judgment unit for judging whether or not to set the color value in the area of comparison of the material-side image for the color value in the area of comparison of the composition image.

To achieve the foregoing object, the video compositing method according to the foregoing invention is characterized in that the comparison processing means generates the composition image by calculating differences on all frames and all pixels of the background-side image and the material-side image.

To achieve the foregoing object, the video compositing method according to the foregoing invention is characterized in that the comparison processing means comprises: a background-side color information collection unit for collecting color information on a certain area of comparison from a group of frames for a predetermined duration of the background-side image along a time axis, thereby generating a background-side color information set; and a material-side color information collection unit for collecting color information on the certain area of comparison from a group of frames for the predetermined duration of the material-side image along the time axis, thereby generating a material-side color information set. The comparison processing means compares the background-side color information set and the material-side color information set along the time axis, thereby generating composition color information on the certain area of comparison of the composition image.

To achieve the foregoing object, the video compositing method according to the foregoing invention is characterized in that the comparison processing means comprises a normalization processing unit for normalizing the background-side color information set along the time axis.

To achieve the foregoing object, the video compositing method according to the foregoing invention is characterized in that: the comparison processing means comprises a supplementary color information acquisition unit for acquiring color information on periphery of the color information at a point in time from the frame of the material-side image at the point in time when it is detected that the background-side color information set and the material-side color information set have a difference smaller than a predetermined threshold at that point in time; and the color information on the periphery is consulted to judge whether or not to set the color of the material-side color information set for the composition color information.

According to the video compositing method or the video compositing system of the present invention, two images (being a background-side image and a material-side image) are prepared with the only difference between such being whether or not a composition material is included. That is, the two images in principle are almost identical except for the composition material. These two images can be compared in order to extract unmatched portions of the images, whereby a composition image is generated.

Incidentally, the term "motion control camera" refers to a camera that is computer controlled so that it can repeat shooting with the same settings and at the same angles. Possible camera controls include internal settings such as the focal length (zooming) of the lens and the focusing position, as well as panning, tracking, traveling, and rotation of the camera itself by means of dedicated tools. This makes it possible to shoot under the same conditions such as exposure and angle any number of times, thereby producing identical images.

According to the present invention, a background-side image which is a shot of an arbitrary background and a material-side image which is a shot of a composition material against the same background as that of the image are prepared, and color-unmatched portions of the images are extracted to create a composition image. The backgrounds of the two images, i.e., the background-side image and the material-side image are thus desirably coincident with each other.

The motion control camera, as mentioned above, can have its motion controlled by a computer so that the camera moves with the same settings and shoots the same background repeatedly. This makes it possible to prepare the two images (being the background-side image and the material-side image) necessary for the present invention in a preferable state.

According to the present invention, the color values of the background-side image and the material-side image are acquired along the time axis from their respective areas of comparison (which may be a single pixel or a group of a plurality of adjoining pixels) lying at the same coordinates. The results are a background-side color information set and a material-side color information set in which color values are collected along the time axis. Since the coordinates of this background-side or material-side color information set are common to all the frames, each individual piece of color information need not include coordinate information. Coordinate information on the area of comparison has only to be included in the background-side or material-side color information set as a whole. Consequently, the background-side or material-side color information set has a one-dimensional volume of information only, and this allows a significant reduction in the amount of information required.

Furthermore, a comparison of this background-side color information set and the material-side color information set along the same time axis allows extremely efficient generation of a composition image in which the composition material is extracted. Specifically, when the background-side color information set and the material-side color information set have no difference, a fixed color is set for the composition color information set at that point in time. If the background-side color information set and the material-side color information set are different, the color information of the material-side color information set is set for the color of the composition color information set. Note that slight differences may be judged to be absent. This judgment may be finely adjusted by those skilled in the art if necessary. This comparison processing is performed on all the areas of comparison across all the frames, whereby the composition image is generated.

Effect of the Invention

According to the video compositing method or the video compositing system of the present invention, it is possible to generate a composition image without using a blue screen. This reduces the studio fees required for using the blue screen and saves the trouble of advance preparations regarding the booking and using of such. Moreover, the composition image can be generated efficiently at high speed against any given background or environment.

BRIEF DESCRIPTION OF THE DRAWINGS

FIG. 8 is a flowchart showing the processing procedure of the video compositing system.

BEST MODE FOR CARRYING OUT THE INVENTION

Hereinafter, an embodiment of the present invention will be described with reference to the drawings. It should be mentioned in advance that the present invention is not limited to these drawings.

Figure 1:
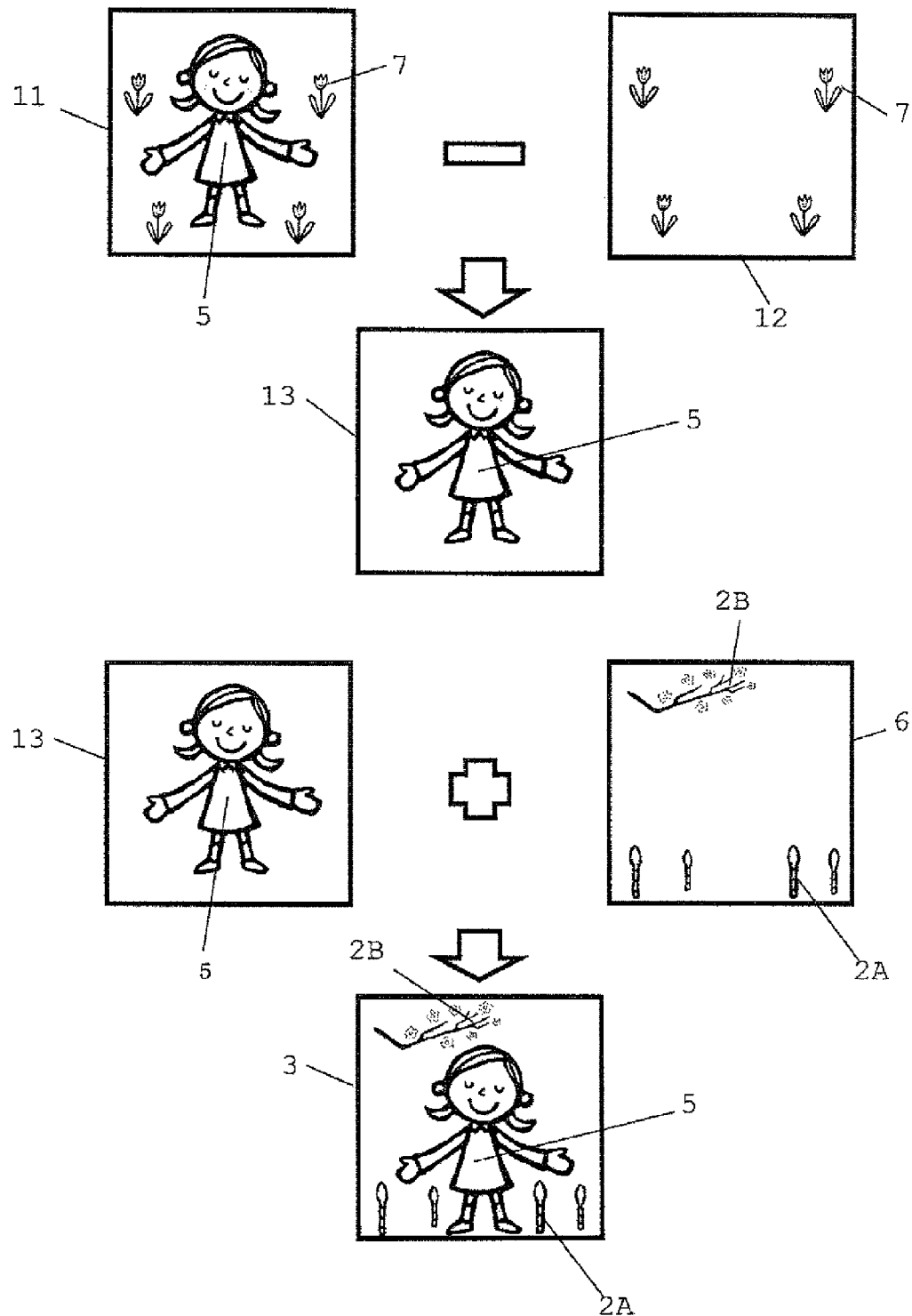
FIG. 1 is a diagram showing the concept of a video compositing method according to the present invention.

A description will initially be given of the comprehensive, basic concept of the present embodiment. In the present embodiment, as shown in FIG. 1, a background-side image 12 which is a shot of tulips 7, being an arbitrary background, a material-side image 11 which is shot to include a FIG. 5, being the composition material, and a background insert image 6 which is a shot of a plum tree 2A and horsetails 2B, being an insert background to be inserted afterwards are prepared.

Figure 5:
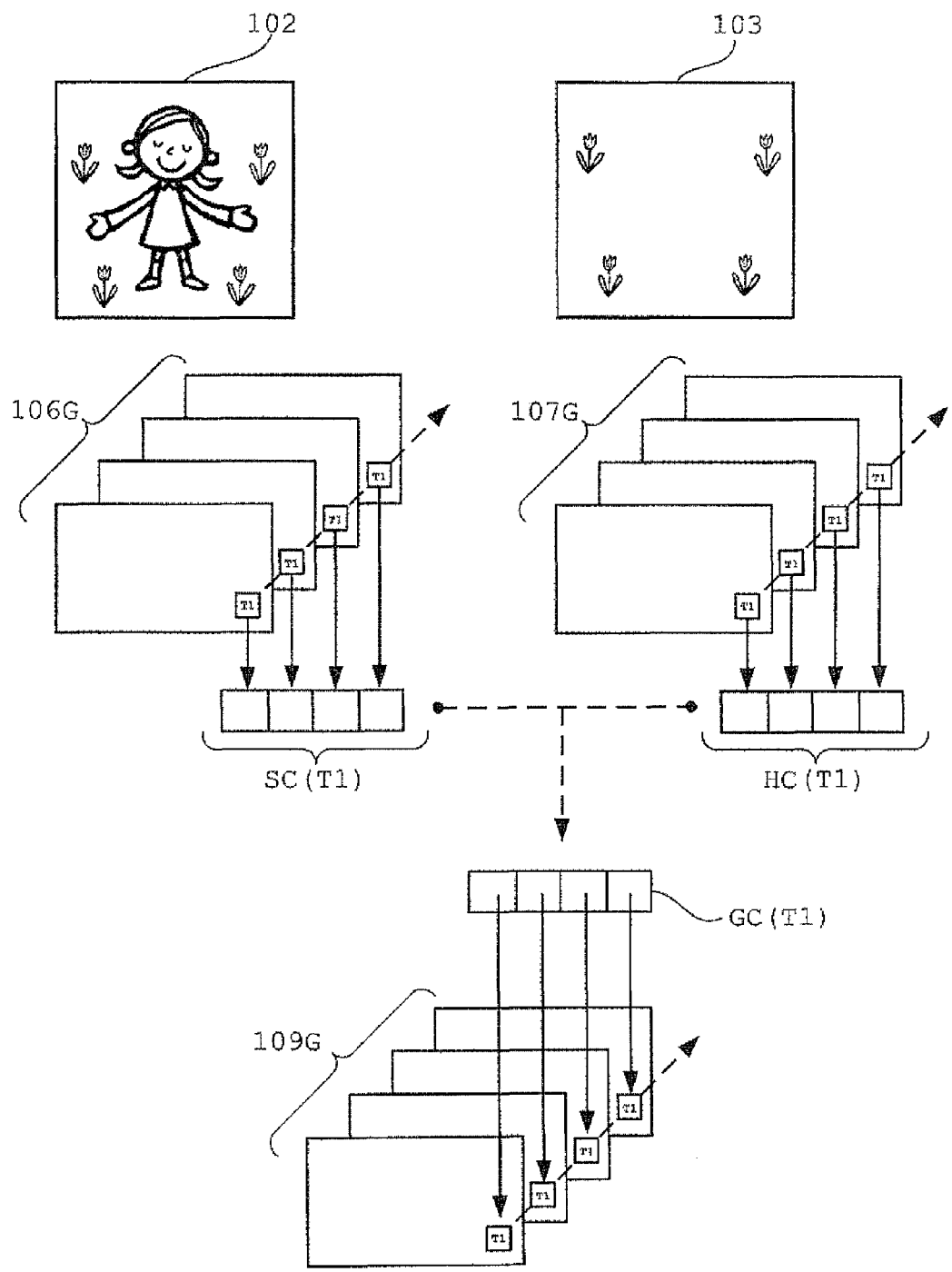
FIG. 5 is a diagram showing part of the procedure of comparison processing in the video compositing system.

Specifically, the FIG. 5 is initially shot in front of the tulips 7 to produce the material-side image 11. With the FIG. 5 removed, the camera is then moved as if shooting the material-side image 11, thereby shooting the tulips 7 alone to produce the background-side image 12. Consequently, the two images 11 and 12 are obtained with only a difference whether the FIG. 5 is present or not. The material-side image 11 and the background-side image 12 are compared to extract differences, thereby obtaining a composition image 13 into which the FIG. 5 alone is extracted. Using existing technologies, this composition image 13 is composited with the background insert image 6 to complete a final image 3 of the FIG. 5 against the background of the plum tree 2A and the horsetails 2B.

Note that these two images, i.e., the background-side image 12 and the material-side image 11 are preferably shot by a motion control camera. The reason is that the motion control camera can have its motion controlled by a computer so that it can move with the same settings to shoot identical images. It should be appreciated that a background-side image 12 and a material-side image 11 equivalent to those shot by a motion camera can be generated without using a motion control camera, from images shot by an ordinary camera or a plurality of different cameras by using software for adjusting a shift in the coordinates between frames. As employed in the present invention, the "same position" criteria for comparing frames are not limited to the local coordinates intrinsic to each individual frame. The same position may also be determined based on global coordinates on the subject side (a reference position on the subject side) in consideration of a relative shift between frames, image zooming, or the like.

Figure 2:
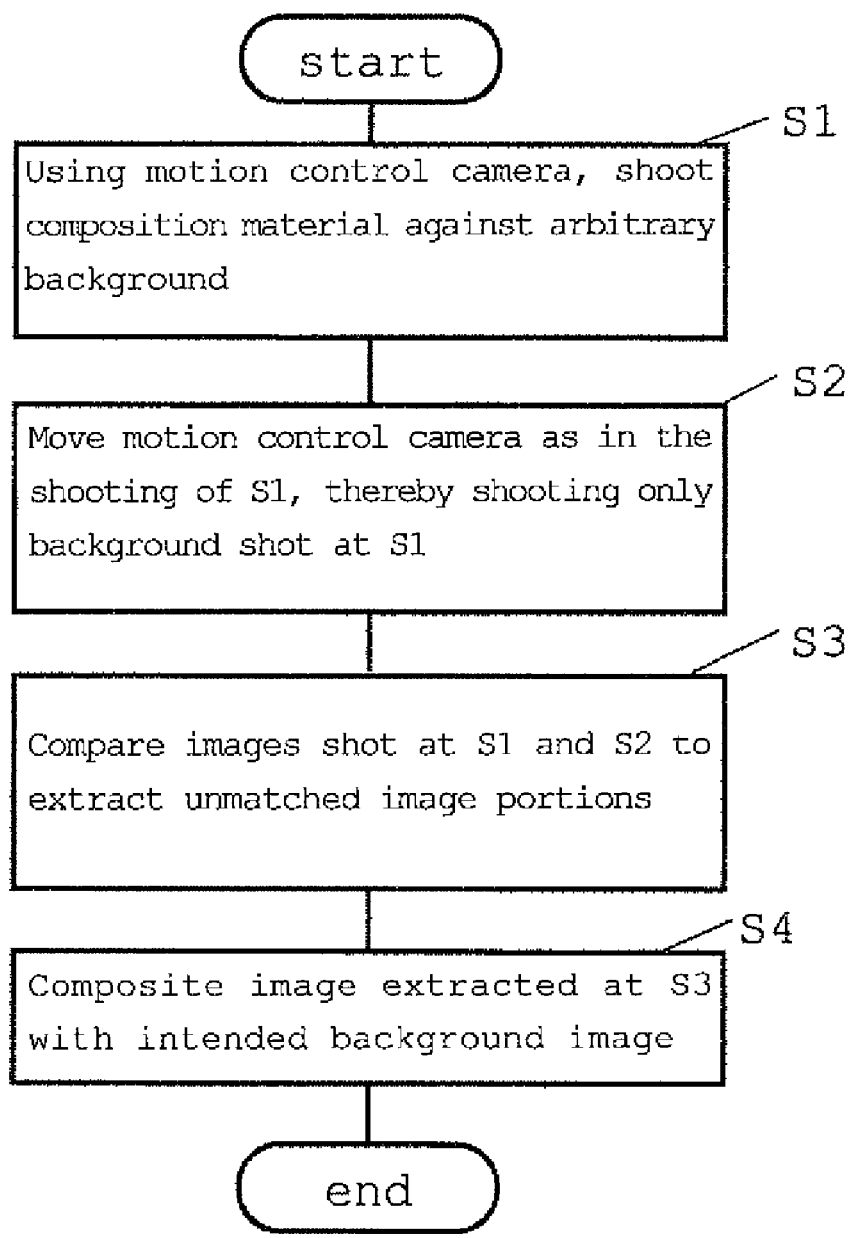
FIG. 2 is a flowchart showing the video compositing method.

FIG. 2 is a flowchart showing the comprehensive basic concept of the present embodiment.

Initially, a material to be composited is shot against an arbitrary background (S1). The shooting is preferably performed by a motion control camera. Next, the composition material is removed to shoot the arbitrary background alone (S2). This shooting also preferably uses the motion control camera. The camera is moved with the same settings as in the shooting of step S1. The images shot at steps S1 and S2 are then compared by using a video compositing system, whereby unmatched portions alone are extracted to obtain a composition image (S3). This provides the same image as obtained by shooting the image material intended for composition against a blue screen. Finally, the composition image generated at step S3 is composited with a background insert image that is intended for background (S4). This completes a composited image.

Figure 3:
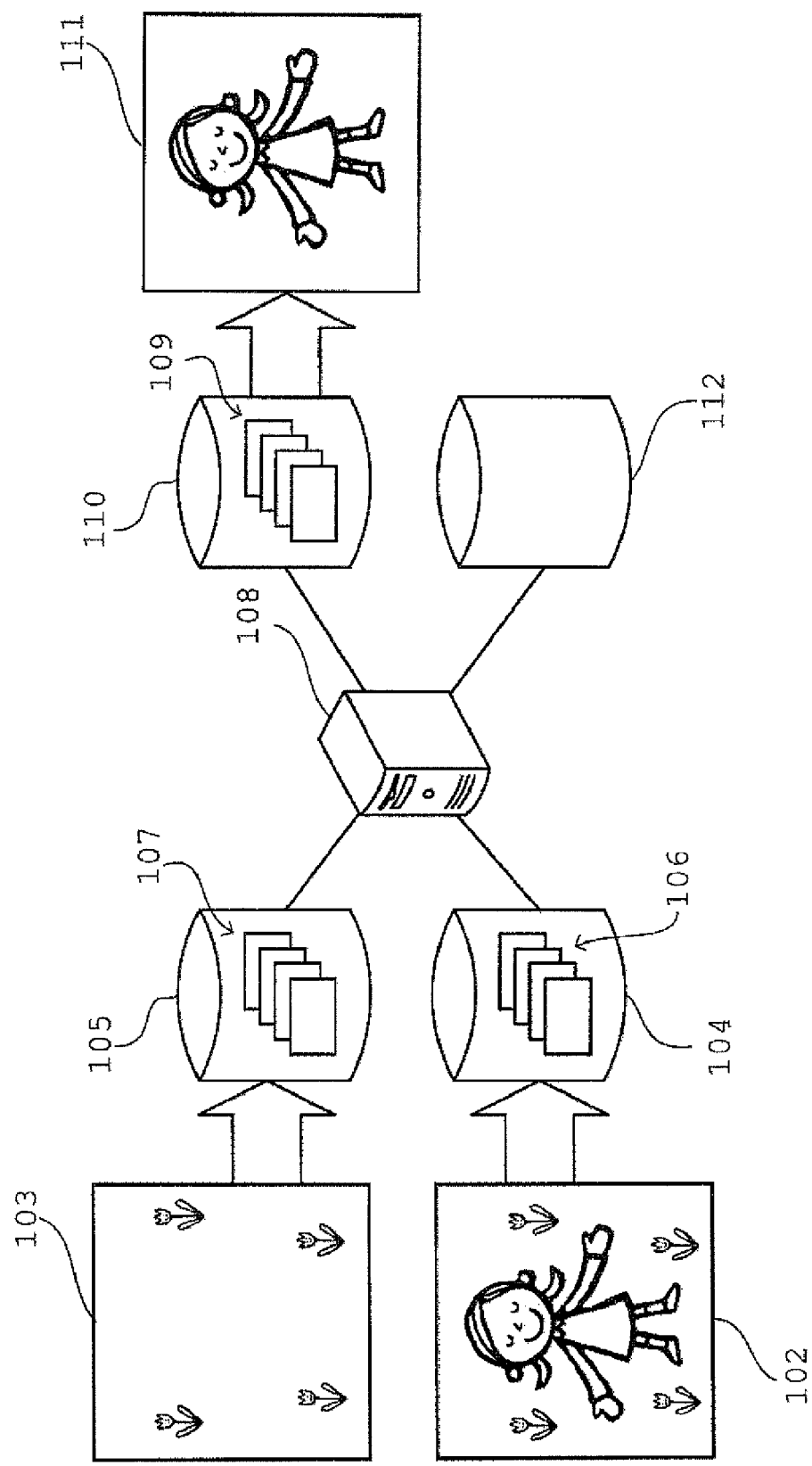
FIG. 3 is a block diagram showing the overall configuration of a video compositing system according to the present embodiment.

Next, a description will be given of the video compositing system according to the embodiment of the present invention. FIG. 3 is a schematic block diagram of this video compositing system 100.

In FIG. 3, the reference numeral 102 represents a material-side image shot by a video camera, and the reference numeral 103 represents a background-side image shot by the video camera. The reference numeral 104 represents a hard disk for storing the material-side image 102 (being material-side image storing means), and the reference numeral 105 represents a hard disk for storing the background-side image 103 (being background-side image storing means). The reference numeral 106 represents frames that constitute part of the material-side image 102, and the reference numeral 107 represents frames that constitute part of the background-side image 103. The reference numeral 108 represents a computer which includes a CPU (Central Processing Unit), a memory, a communication bus, and a plurality of input/output interfaces. The reference numeral 109 represents frames that are generated after the processing of this computer 108. The reference numeral 110 represents a hard disk for storing these frames 109 (being composition image storing means), and the reference numeral 111 represents a composition image that is constructed from these frames 109. The reference numeral 112 represents a hard disk which contains a program to be executed by this computer 108 (being program storing means).

Figure 4:
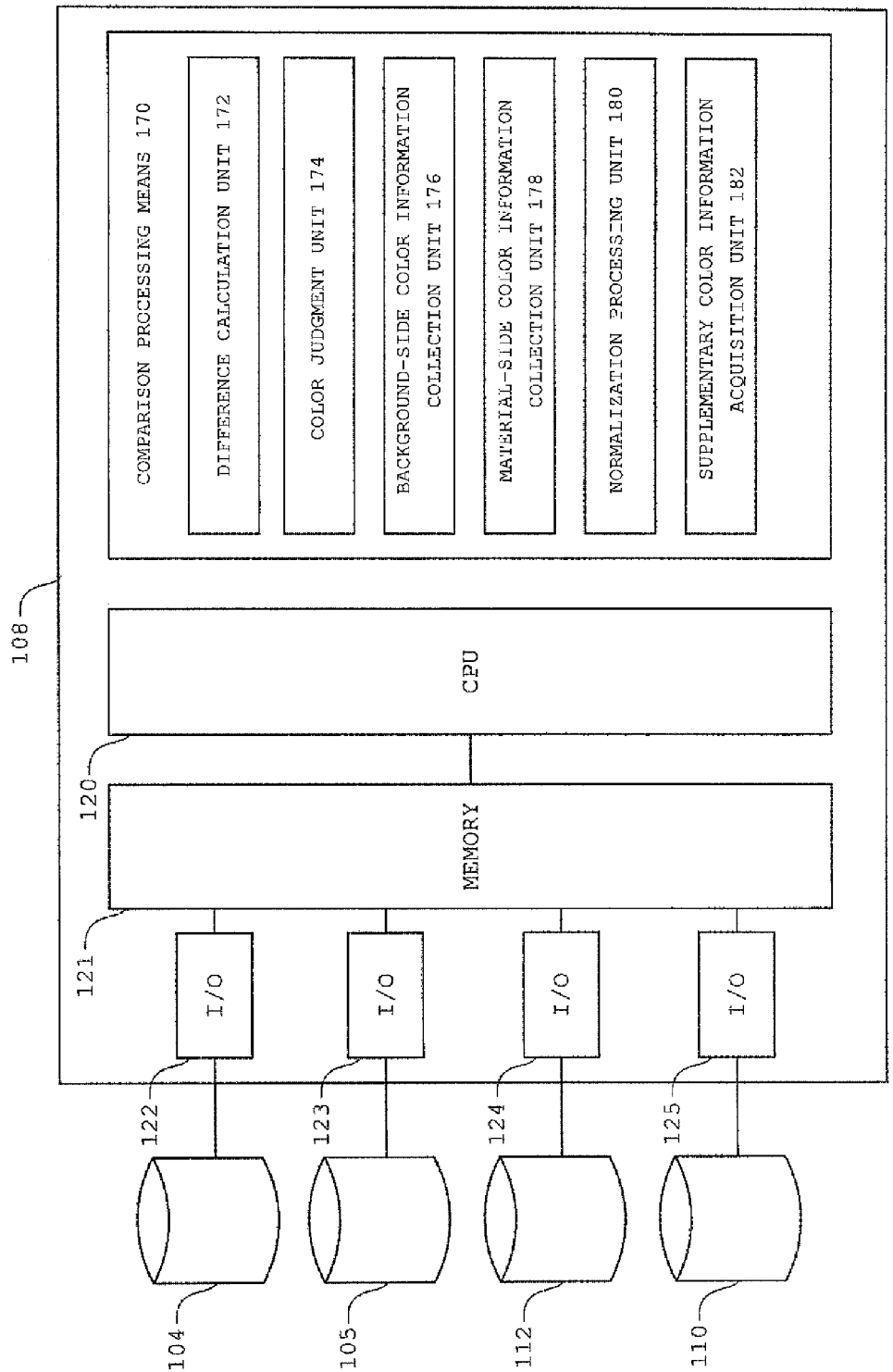
FIG. 4 is a block diagram showing the configuration of the computer in the video compositing system.

FIG. 4 is a diagram showing the internal configuration of the computer 108. It should be appreciated that this internal configuration also includes various functions that are obtained by storing the program into a memory 121 of the computer 108 once and running this program on a CPU (Central Processing Unit) 120.

The computer 108 includes the CPU 120, the memory 121, and input/output interfaces 122, 123, 124, and 125 which are connected with the foregoing storing means 104, 105, 110, and 112, respectively. There is also provided comparison processing means 170 which is a functional configuration obtained by running the program on the CPU 120. This comparison processing means 170, more specifically, includes a difference calculation unit 172, a color judgment unit 174, a background-side color information collection unit 176, a material-side color information collection unit 178, a normalization processing unit 180, and a supplementary color information acquisition unit 182.

The comparison processing unit 170 compares the background-side image 103 and the material-side image 102 on the basis of color information. Based on the result of comparison, it also generates the composition image 111 in which the composition material is extracted.

Specifically, the difference calculation unit 172 calculates a difference in color value between the background-side image 103 and the material-side image 102 in an area of comparison. This area of comparison refers to a group of one or more pixels in the same position (here, the same coordinates) in each of the frames 107 of the background-side image 103 and each of the frames 106 of the material-side image 102. In the present embodiment, the area of comparison consists of a single pixel, whereas it may include a plurality of pixels (for example, 8×8 pixels). Incidentally, while the area of comparison here consists of a pixel at the same local coordinates in each frame 106, the area of comparison may include a pixel or pixels that fall on the same position with reference to the global coordinates on the subject side (image side) (being the reference position on the side of a certain subject) in consideration of the degree of scaling.

Based on the magnitude of the difference calculated by the difference calculation unit 172, the color judgment unit 174 judges whether or not to set the color value in the area of comparison of the material-side image 102 for the color value in the area of comparison of the composition image 111. More specifically, if there is no difference, this area of comparison is considered to be a background area since the background-side image 103 and the material-side image 102 have no difference. Then, certain color (for example, blue) information, which is determined in advance for the sake of cutout, is set for the composition image 111. If there is a difference, on the other hand, the color information on this material-side image 102 is set for the composition image 111 since the background-side image 103 and the material-side image 102 show a difference which indicates the presence of the composition material FIG. 5.

The background-side color information collection unit 176, as shown in FIG. 5, collects color information on a certain area of comparison T1 (here, a certain single pixel) from a group of frames 107G for a predetermined duration of the background-side image 103 along the time axis, thereby generating a background-side color information set HC(T1). Meanwhile, the material-side color information collection unit 178 collects color information on the area of comparison T1 at the same coordinates as with the background-side image, from a group of frames 106G for the predetermined duration of the material-side image 102 along the time axis, thereby generating a material-side color information set SC(T1). That is, prior to specific comparison processing, the color information on the certain areas of comparison T1 at the same coordinates of the background-side image 103 and the material-side image 102 is collected along the direction of the time axis, whereby the color information is arranged in one dimension. Coordinate information on the areas of comparison T1 is added to the entire sets of one-dimensional color information, with a significant reduction in the amount of information.

Using the background-side color information set HC(T1) and the material-side color information set SC(T1) collected in the direction of the time axis, the color judgment unit 174 compares the color information on the frames 107 of the background-side image 103 and the frames 106 of the material-side image 102 successively along the time axis. As shown in FIG. 5, this color judgment generates a composition color information set GC(T1) corresponding to the areas of comparison T1 in a group of frames 109G of the composition image 111.

Figure 6:
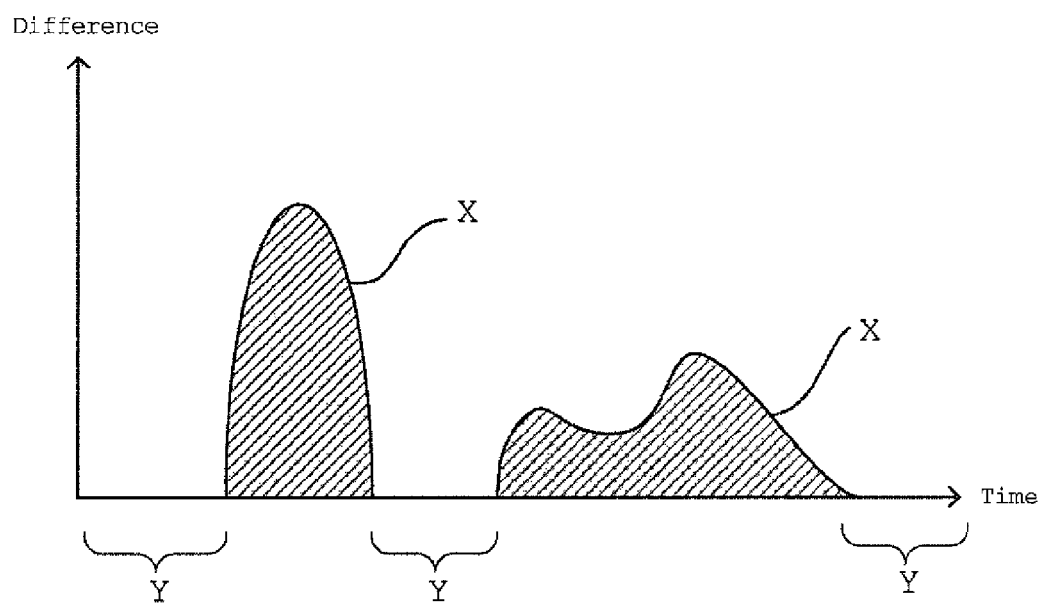
FIG. 6 is a graph showing an example of color differences along the time axis in the video compositing system.

As shown by a difference graph of FIG. 6, the color judgment refers to comparing (calculating differences between) a color variation graph of the background-side color information set HC(T1) and a color variation graph of the material-side color information set SC(T1) in the direction of the time axis. If the background-side color information set HC(T1) and the material-side color information set SC(T1) are different in color (see areas X where differences occur), the color information on the material-side color information set SC(T1) is set for the composition color information set GC(T1). On the other hand, if the background-side color information set HC(T1) and the material-side color information set SC(T1) are identical in color (see areas Y where no difference occurs), predetermined fixed color information (here, blue for a blue screen) is set for the composition color information set GC(T1). The resulting composition color information set GC(T1) provides color information in which the composition material alone is extracted. This comparison processing is performed on all the areas of comparison T, and all the composition color information sets GC are integrated into the composition image 111.

Note that the normalization processing unit 180 normalizes the data on the background-side color information set HC and the material-side color information set SC. This makes it possible to eliminate the influence of light fluctuations, noise, and the like included in both the images, and compare the background-side color information sets HC and the material-side color information sets SC appropriately. Although not shown in particular, the color judgment unit 174 also preferably takes noise components into consideration of a threshold for judging the presence or absence of the composition material, instead of or in addition to the normalization of the color information sets. For example, differences smaller than or equal to a predetermined threshold in value, if any, will be determined to be noise that is irrelevant to the composition material. It is then judged that there is the background. As with the supplementary color information acquisition unit 182 to be described below, a plurality of thresholds may be provided for difference judgments so that each individual judgment can be made in greater details.

Suppose that a point in time is detected where the difference between the background-side color information set HC and the material-side color information set SC falls below a predetermined threshold. Then, the supplementary color information acquisition unit 182 accesses the information on the frame 106 of the material-side image 102 at the point in time to acquire color information on the adjacent periphery of the area of comparison T1, and provides the same to the color judgment unit 174. If the color information on the periphery is the same as or generally similar to the color information on the area of comparison T1, the color judgment unit 174 determines that the entire area of the periphery including the area of comparison T1 is changed in color because of the composition material, not just noise, and sets the color information on the material-side color information set SC for the composition color information set GC. On the other hand, if the color information on the periphery is different from the color information on the area of comparison T1, the color judgment unit 174 determines it to be mere noise and sets predetermined blue information for the composition color information set GC. This consequently allows efficient extraction of locations and the like where a color highly similar to the background color changes across a wide range, like the trace of a quick motion of the composition material.

As above, the color judgment is usually performed by using the color information sets that are collected in the direction of the time axis, while detailed judgment is performed by collecting peripheral color information from a frame only where judgment is difficult to make. This allows a significant reduction in the amount of information processing.

Figure 7:
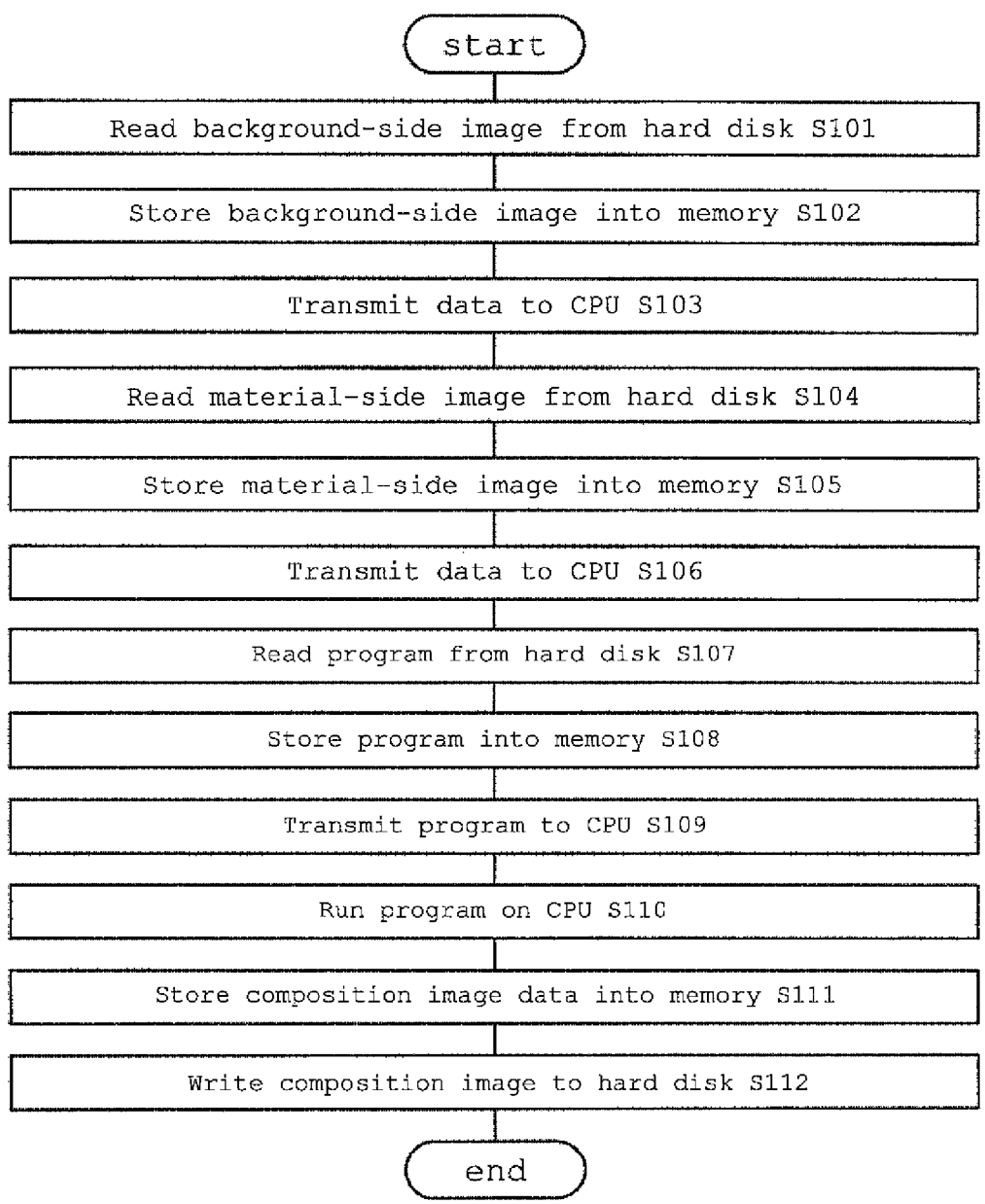
FIG. 7 is a flowchart showing the processing procedure of the video compositing system.

FIG. 7 is a flowchart showing the procedure of composition processing by the present video compositing system 100. Initially, data is read from the hard disk 105, which contains a background-side image 103 shot by a camera, through the input/output interface 123 (S101). The data is stored into the memory 121 (S102), and transmitted to the CPU 120 (S103). Similarly, data is read from the hard disk 104, which contains a material-side image 102 shot by the camera, through the input/output interface 122 (S104). The data is stored into the memory 121 (S105), and transmitted to the CPU 120 (S106). Next, the program intended for the video compositing system, stored in the hard disk 112, is read through the input/output interface 124 (S107), stored into the memory 121 (S108), and transmitted to the CPU 120 (S109). This CPU 120 runs the program to perform video compositing processing, using the data on the background-side image 103 and the material-side image 102. A composition image 111 resulting from this processing is transmitted to the memory 121 (S111), and written to the hard disk 110 through the input/output interface 125.

FIG. 8 is a flowchart showing the detailed procedure of the video compositing processing at step S110 in the flowchart of FIG. 7.

For this video compositing processing, the background-side image 103 and the material-side image 102 both are processed in units of the areas of comparison lying at the same coordinates, or pixel by pixel in the present embodiment in particular. At step S201, it is checked if the background-side image 103 or the material-side image 102 has any pixel (area of comparison) where the composition processing is yet to be performed.

If there is any pixel where the composition processing is yet to be performed, the flow proceeds to step S202. For the new one pixel (area of comparison), the material-side color information collection unit 178 collects color information on the material-side image 102, thereby generating a material-side color information set SC. The background-side color information collection unit 176 collects the color information on the background-side image 103 along the time axis, thereby generating a background-side color information set HC. Then, at step S203, the normalization processing unit 180 normalizes these material-side color information set SC and background-side color information set HC.

After the collection of the color information, these material-side color information set SC and background-side color information set HC are compared for a difference in color along the time axis (i.e., in the order of frames). Specifically, at step S204, it is initially checked if these certain sets of material-side color information SC and background-side color information HC have any time (frame) where color values are yet to be judged. If there is any time unjudged, the flow proceeds to step S205. The difference calculation unit 172 calculates a difference in color value between the material-side color information set SC and the background-side color information set HC at that time.

Next, the color judgment unit 174 determines whether or not this difference value exceeds a first threshold (being greater than a second threshold to be described later) (step S206). If the first threshold is exceeded, the difference obviously derives from the composition material. The flow then proceeds to step S207, where the color information on the material-side color information set is set for the composition color information set GC at that time. If the first threshold is not exceeded, on the other hand, the flow proceeds to step S208, where the color judgment unit 174 determines whether or not this difference value exceeds a second threshold (being smaller than the foregoing first threshold). If the difference value is smaller than or equal to the second threshold, both the areas are considered to be showing the background. The flow then proceeds to step S209, where the fixed blue information is set for the composition color information set GC at that time. If the difference value exceeds the second threshold (being smaller than the foregoing first threshold), on the other hand, it is still difficult to determine whether there is the composition material or the background. The flow then proceeds to step S210, where the supplementary color information acquisition unit 182 accesses the frame 106 of the material-side image 102 at that point in time to acquire the color information on the adjacent periphery of the area of comparison, and provides it to the color judgment unit 174. The color judgment unit 174 then makes a judgment again, including the color information on the periphery (S211). If the color information on the periphery is the same as or generally similar to the color information on the area of comparison, the pixel is determined to be of the composition material. The flow proceeds to step S207, where the color information on the material-side color information set SC is set for the composition color information set GC at that time. If the color information on the periphery is not the same nor similar to the color information on the area of comparison, on the other hand, the difference is determined to be some noise that occurs only on the pixel in the area of comparison. The flow proceeds to step S209, where the fixed blue information is set for the composition color information set GC at that time.

When this color judgment processing is completed, in order to proceed to the composition processing on a next point in time (S212), the flow returns to step S204, and it is again checked if the material-side color information set SC and the background-side color information set HC have any time where color values are yet to be judged.

By the repetition of this, the color judgment goes through the entire time axis at step S204. In order to proceed to the comparison processing on a next pixel (area of comparison) (S213), the flow returns to step S201, and it is checked if the background-side image 103 or the material-side image 102 has any pixel (area of comparison) where the composition processing is yet to be performed. If there is no pixel left, the flow proceeds to step S214, determining that the composition processing is completed on all the pixels. A composition image 111 is then generated from all the composition color information sets GC, and this composition image 111 is checked whether unnatural or not. This check may be carried out by an operator using a video display unit. Predetermined programs may be used to check the image motions for possible unnaturalness (discontinuity) left. If the image is unnatural, judgment thresholds and other conditions are modified (S215) to perform the composition processing again from the beginning. If the image is natural, on the other hand, this composition processing is ended.

According to this video compositing system 100, it is possible to generate a composition image from an image that is shot against an arbitrary background, without using special equipment such as a blue screen. This eliminates the need for special studios and the like, allowing a significant reduction in the shooting cost and time. Besides, the shooting is not limited to studio sizes but can be performed against a background and in environment similar to those of the image that is to be composited afterward, such as in a vast plain. This can produce a composition image that brings less feeling of strangeness when composited.

In particular, when shooting a film or the like, it is possible to perform automatic collective composition processing on a relatively long image such as a single cut (single scene). This allows a significant reduction of the compositing time. Since differences between the background-side image and the material-side image can be utilized to cut off the background alone and leave the composition material alone, it is also possible to efficiently generate a composition image with high precision.

Moreover, in the present embodiment, the color information on the one-or-more-pixel areas of comparison of both the background-side image and the material-side image is all collected in the direction of the time axis to prepare color information sets, and these color information sets are compared with each other. As a result, each individual piece of color information need not include two-dimensional coordinates in itself. This allows a significant reduction in the amount of information, and the composition processing can be performed in a short time. In particular, the thresholds for color judgment may be adjusted based on a change in color in the direction of the time axis, in consideration of light fluctuations, noise, and the like in the shooting environment.

Furthermore, in the present embodiment, the color information sets collected in the direction of the time axis are normalized. This clarifies the judging criteria of the color judgment unit, so that the composition image can be generated appropriately. Unnecessary noise and the like can also be removed appropriately.

In the present embodiment, if the composition color information set GC and the material-side color information set SC have a difference value not smaller than zero but the second threshold, the supplementary color information acquisition unit 182 acquires the color information on the periphery at that point in time and provides it to the color judgment unit 174. This makes it possible to extract the composition material with higher precision. For example, when a composition material such as a car and a figure is moving at high speed, each image frame may show it as slight persistence of vision in almost the same color as that of the background. Even such a composition material, having only small differences from the background-side image, can be judged and extracted as a composition material if the small differences occur over a certain size of area. In particular, each individual frame will not be accessed to collect the color information on the periphery until the difference value falls below the second threshold. The amount of information to be retained in the memory can thus be reduced significantly when compared to the case where the color information on the frames is always used in a two-dimensional fashion.

Note that the present embodiment has dealt only with the case where the color information on the areas of comparison of the background-side image and the material-side image is collected in the direction of the time axis to generate color information sets, and these color information sets are compared with each other. The present invention is not limited thereto, however. For example, a whole series of comparison processing including the extraction of color information, difference detection, and setting of composition color information may be performed on certain areas of comparison in one frame of the background-side image and the material-side image. This comparison processing, when completed, is shifted to the next frame so that the same certain areas of comparison are subjected to the comparison processing. Alternatively, comparison processing may be performed on all the areas of comparison (all the pixels) of the background-side image and the material-side image within one frame before the comparison processing is shifted to the next frame to deal with all the areas of comparison.

The present embodiment has also dealt with the case where the areas of comparison are defined in the same positions with reference to the local coordinates in the respective frames. The present invention is not limited thereto, however. For example, the areas of comparison may be located in the same positions in consideration of a relative deviation between frames due to camera shakes and the like, and the zooming of the images. Specifically, the present invention also covers the cases where the arrangement of pixels in each frame is defined with respect to the global coordinates on the subject side (with reference to a reference position on the subject side) so that the areas of comparison in the same arrangement are compared with each other.

The present embodiment has also dealt with the case where the background-side image and the material-side image are shot by the same motion control camera. The present invention is not limited thereto, however. The images may be shot by different video cameras.

The present embodiment has also dealt with the case where the composition image generated is composited with a background insert image which is shot separately. The present invention is not limited thereto, however. Computer graphics may be used as the background insert image.

The video compositing system 100 of the present embodiment has dealt with the case where a plurality of hard disks and input/output interfaces are used to store the material-side image, the background-side image, the composition image, the program, and the like separately. The present invention is not limited thereto, however. Common memory means may of course be used for collective storage.

The invention claimed is:

1. A video compositing method comprising: preparing a background-side image which is a shot of an arbitrary background and a material-side image which is a shot of a composition material against the same background as that of the background-side image; and performing comparison processing on the background-side image and the material-side image to generate a composition image in which the composition material is extracted, the comparison processing includes comparing color values between the background-side image and the material-side image in respective areas of comparison lying in the same positions in respective frames of the same timing, the areas of comparison including one or more pixels and collecting color information on a certain area of comparison from a group of frames for a predetermined duration of the background-side image along a time axis, thereby generating a background-side color information set;

collecting color information on the certain area of comparison from a group of frames for the predetermined duration of the material-side image along the time axis, thereby generating a material-side color information set; and comparing the background-side color information set and the material-side color information set along the time axis, thereby generating composition color information on the certain area of comparison of the composition image wherein: when a point in time is detected where the background-side color information set and the material-side color information set have a difference smaller than a predetermined threshold, color information on periphery of the certain area of comparison at the point in time is acquired from the frame of the material-side image at the point in time; and the color information on the periphery is consulted to judge whether or not to set the color information of the material-side color information set for the composition color information.

2. The video compositing method according to claim 1, wherein when the areas of comparison of the background-side image and the material-side image have a difference in color value, the color value in the area of comparison of the material-side image is set for the color value in the area of comparison of the composition image.

3. The video compositing method according to claim 1, wherein the composition image is generated by performing the comparison processing on all frames and all pixels of the background-side image and the material-side image.

4. The video compositing method according to claim 1, wherein: the background-side color information set is normalized along the time axis; and the normalized background-side color information set is compared with the material-side color information set.

5. The video compositing method according to claim 1, wherein both the background-side image and the material-side image are shot by a motion control camera.

6. The video compositing system, comprising:
background-side image storing means for storing a background-side image which is a shot of an arbitrary background;

material-side image storing means for storing a material-side image which is a shot of a composition material against the same background as that of the background-side image;

comparison processing means for comparing the background-side image and the material-side image, and comprising a background-side color information collection unit for collecting color information on a certain area of comparison from a group of frames for a predetermined duration of the background-side image along a time axis, thereby generating a background-side color information set;

a material-side color information collection unit for collecting color information on the certain area of comparison from a group of frames for the predetermined duration of the material-side image along the time axis, thereby generating a material-side color information set; and composition image storing means for storing the composition image, and wherein the comparison processing means compares the background-side color information set and the material-side color information set along the time axis, thereby generating composition color information on the certain area of comparison of the composition image and generating a composition image in which the composition material is extracted based on the result of comparison; and the comparison processing means compares color values between the background-side image and the material-side image in respective areas of comparison lying in the same positions in respective frames of the same timing, the areas of comparison including one or more pixels, and wherein the comparison processing means comprises a supplementary color information acquisition unit for acquiring color information on periphery of the certain area of comparison at a point in time from the frame of the material-side image at the point in time when it is detected that the background-side color information set and the material-side color information set have a difference smaller than a predetermined threshold at that point in time; and the color information on the periphery is consulted to judge whether or not to set the color information of the material-side color information set for the composition color information.

7. The video compositing system according to claim 6, wherein the comparison processing means further comprises:
a difference calculation unit for calculating a difference in color value between the background-side image and the material-side image in the areas of comparison; and a color judgment unit for judging whether or not to set the color value in the area of comparison of the material-side image for the color value in the area of comparison of the composition image.

8. The video compositing system according to claim 6, wherein the comparison processing means generates the composition image by calculating differences on all frames and all pixels of the background-side image and the material-side image.

9. The video compositing system according to claim 6, wherein the comparison processing means comprises a normalization processing unit for normalizing the background-side color information set along the time axis.

* * * * *